United States Patent
Suren

(10) Patent No.: US 7,321,020 B2
(45) Date of Patent: Jan. 22, 2008

(54) POLYCONDENSATION PRODUCTS AND A PROCESS FOR THEIR PREPARATION

(75) Inventor: Josef Suren, Bad Wunnenberg-Haaren (DE)

(73) Assignee: Bakelite AG, Duisburg (DE)

( * ) Notice: Subject to any disclaimer, the term of this patent is extended or adjusted under 35 U.S.C. 154(b) by 0 days.

(21) Appl. No.: 10/617,104

(22) Filed: Jul. 10, 2003

(65) Prior Publication Data

US 2005/0020860 A1    Jan. 27, 2005

(30) Foreign Application Priority Data

Jul. 12, 2002 (DE) ............................... 102 31 851

(51) Int. Cl.
*C08G 14/02* (2006.01)
*C08G 14/12* (2006.01)
*C08G 8/28* (2006.01)

(52) U.S. Cl. ..................... 528/129; 528/137; 528/144; 528/486; 528/495

(58) Field of Classification Search ................ 528/129, 528/137, 144, 486, 495
See application file for complete search history.

(56) References Cited

U.S. PATENT DOCUMENTS 4,337,334 A    6/1982    Shimizu et al.
5,552,509 A    9/1996    Takashima et al.

FOREIGN PATENT DOCUMENTS

WO    WO 01/46101 A1    6/2001

OTHER PUBLICATIONS

XP-002258554, 1982.

*Primary Examiner*—Duc Truong
(74) *Attorney, Agent, or Firm*—Charles A. Muserlian

(57) ABSTRACT

The invention relates to the polycondensation products produced by reaction of bisphenol residues from bisphenol production with an aldehyde in an acidic medium useful for the production of refractory molded bodies, of unmolded substances used in the refractory industry and, together with coating powder residues, as binding agents or binding agent components for the production of molded nonwoven fabric parts.

7 Claims, No Drawings

POLYCONDENSATION PRODUCTS AND A PROCESS FOR THEIR PREPARATION

The invention relates to novel polycondensation products based on bisphenol residues.

STATE OF THE ART

Bisphenol residues are distillation residues from the production of bisphenols and the residues accumulating by far in the largest amounts are the distillation residues from the production of bisphenol A. These are resin-like by-products, which are formed in the production of bisphenol A by condensation of 2 moles of phenol with 1 mole of acetone and which, after the separation by distillation of the bisphenol A, remain as the residue. At ambient temperature, they are solid to semisolid and tacky and have a softening point in the range of 60 to 70° C. At 75° C., their viscosity is in the range of approximately 5000 to 50,000 mPas.

Various attempts have been made to utilize these by-products further to avoid having to dispose of them as hazardous waste, which otherwise would be necessary. EP-A 0 533 850 discloses, for example, mixtures comprised of residues from the bisphenol A production and phenolic resins as binding agent mixtures for the production of high-temperature resistant molding materials. According to DE-A 19529030, distillation residue from bisphenol production, if appropriate after cracking, is subjected to oxidative treatment and/or reacted with an epoxide and used as bright coal substance former for molding sands.

Nevertheless, there continues to be a need for application possibilities of bisphenol A residues, particularly such uses in which bisphenol A residues are converted in a simple manner to higher-value products.

OBJECTS OF THE INVENTION

It is an object of the invention to provide novel useful polycondensation products from bisphenol residues from bisphenol production to avoid disposal thereof and a process for their production.

It is another object of the invention to use the said polycondensation products in the production of refractory molded parts, refractory unmolded elements and molded non-woven fabric elements.

These and other objects and advantages of the invention will become obvious from the following detailed description.

THE INVENTION

The polycondensation products of the invention are produced by reaction of a bisphenol residue from bisphenol production with an aldehyde in an acidic medium. Preferably, the bisphenol reside us a result of bisphenol A production. The aldehydes are preferably of 1 to 6 carbon atoms and most preferably are formaldehydes.

The resulting novolak, non-tacky polycondensation products have a melting point of 70 to 90° C. and can be cured with a curing agent such as hexamethylene tetramine or with resols or epoxide compounds at temperatures greater than 100° in a known manner to produce a non-melting, cross-linked product.

While bisphenol residues can only be dissolved with great difficulties in conventional solvents, the polycondensation products of the invention are surprisingly soluble in customary industrial solvents having a high boiling point, such as ethylene glycol, diethylene glycol, polyglycols, phthalates or the esters denoted by the designation DBE. This permits the production of solutions which are generally considered to be toxicologically safe and which can be processed at ambient temperature, and permits the production of formed refractory products according to methods known per se, and it permits doing so in cold as well as also in warm mixing processes.

The pure polycondensation products of th invention have a lower carbon yield during their carbonization than phenol novolaks. But, surprisingly, with the refractory products produced with the polycondensation products of the invention, after the carbonization, a higher carbon yield and a higher oxidation resistance is obtained than with corresponding refractory products produced according to prior art with phenol novolaks.

The polycondensation products of the invention are not tacky and can be ground at ambient temperature. Due to the above listed properties, the powdered resins are suitable particularly for the production of unmolded substances which are used in the refractory industry.

The composition of the mixture and the manner of production for the formed refractory products as well as also for the unmolded substances can correspond to prior art such as is known form the technology of phenol novolaks. But the powdered resins are also suitable in combination with coating powder residues as binding agents or binding agent components for the production of molded nonwoven fabric parts, and the known technologies can also be used.

The process of the invention for the production of polycondensation products comprises reacting a bisphenol residue from bisphenol production with an aldehyde in the presence of a catalytic amount of an acid, preferably formaldehyde. The residue is preferably derived from bisphenol A production and the preferred molar ratio of bisphenol residue and aldehyde is 1:0.2 to 1:0.8. In a preferred embodiment, phenolic compounds such as phenol or alkylphenols are added up to 90 parts by weight based on the bisphenol residues.

The products of the invention are useful for the production of refractory molded bodies, unmolded substances for use in the refractory industry and molded unwoven fabric elements by known procedures with superior properties.

Various modifications of the products and processes of the invention may be made without departing from the spirit or scope thereof and it is to be understood that the invention is intended to be limited only as defined in the appended claims.

What I claim is:

1. In the production of refractory articles, the improvement comprises incorporating a polycondensation product produced by reacting a bisphenol residue from the production of bisphenols with an aldehyde in an acidic medium and at least one phenolic compound into the refractory material and forming the refractory article.

2. In the production of claim 1, the bisphenol residue is from bisphenol A production.

3. In the production of claim 1, the aldehyde is formaldehyde.

4. In the production of claim 1, the phenolic compound is phenol.

5. In the production of claim 1, the polycondensation product is dissolved in a solvent.

6. In the production of claim 5, the solvent is high boiling.

7. In the production of claim 5, the solvent is selected from the group consisting of ethylene glycol, diethylene glycol, polyglycols and phthalates.

* * * * *